Figure 7:
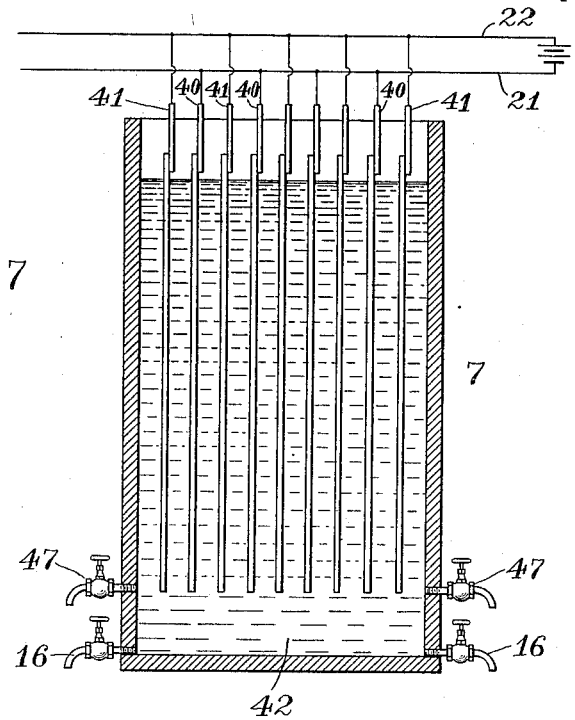

H. S. MacKAY.
APPARATUS FOR EXTRACTING METALS FROM THEIR ORES.
APPLICATION FILED JAN. 20, 1910.
1,084,351.
Patented Jan. 13, 1914.
4 SHEETS—SHEET 1.
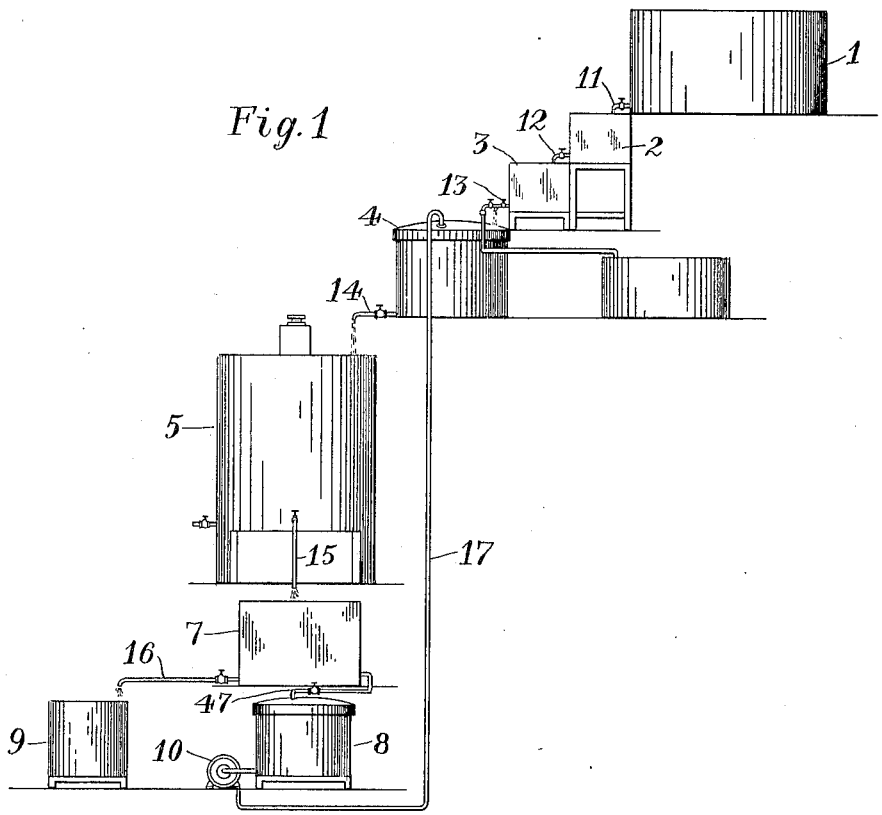
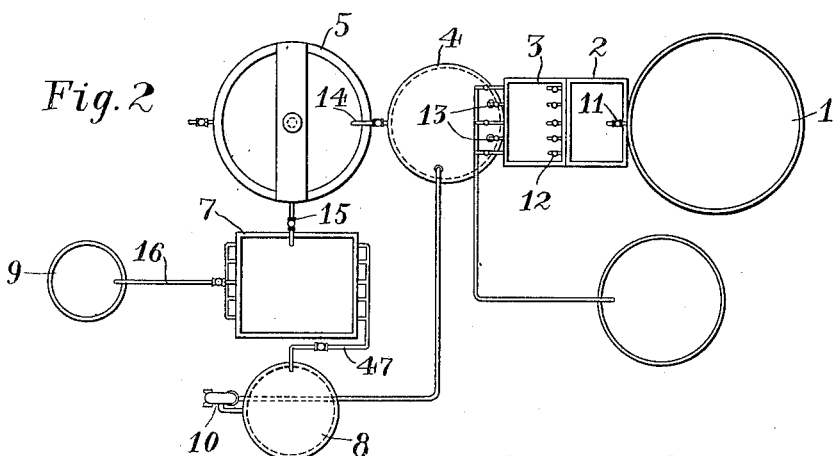
WITNESSES:
David J. Walsh
M. A. Butler
Henry S. MacKay INVENTOR
BY
F. F. Crampton
ATTORNEY
COLUMBIA PLANOGRAPH CO., WASHINGTON, D. C.

H. S. MacKAY.
APPARATUS FOR EXTRACTING METALS FROM THEIR ORES.
APPLICATION FILED JAN. 20, 1910.
1,084,351.
Patented Jan. 13, 1914.
4 SHEETS—SHEET 2.
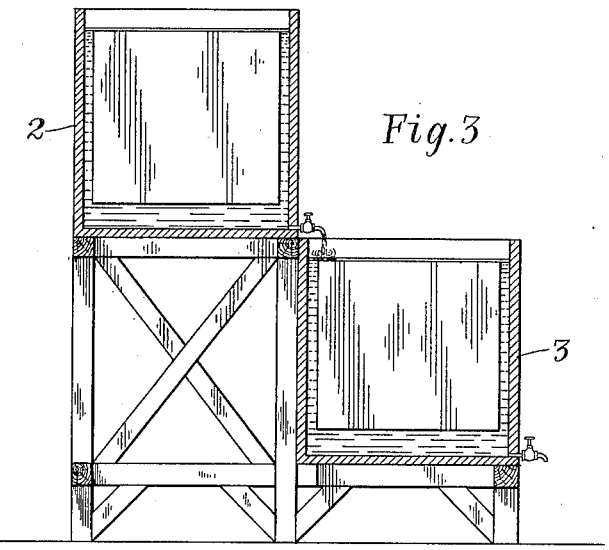
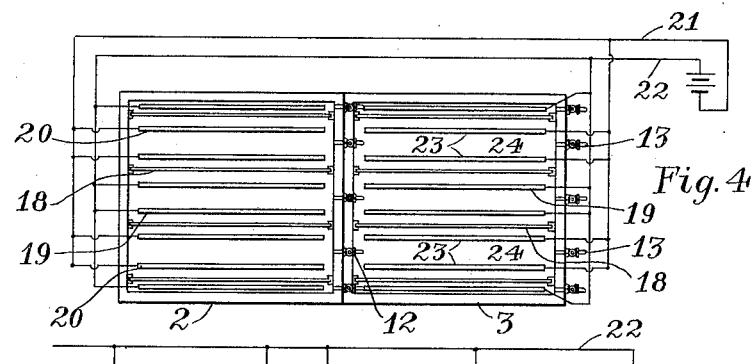
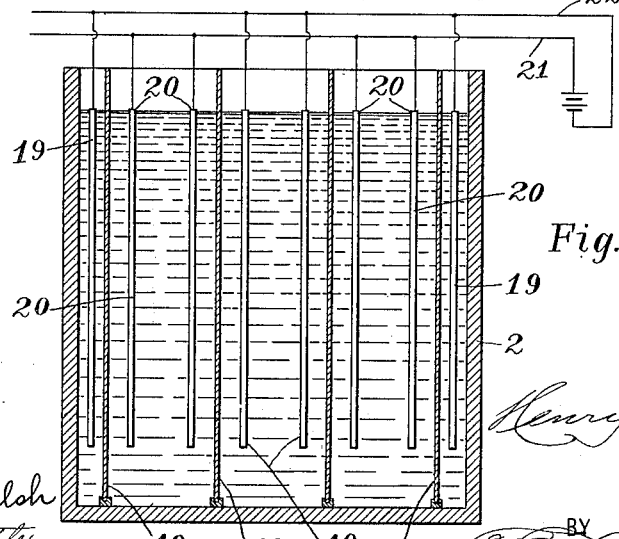

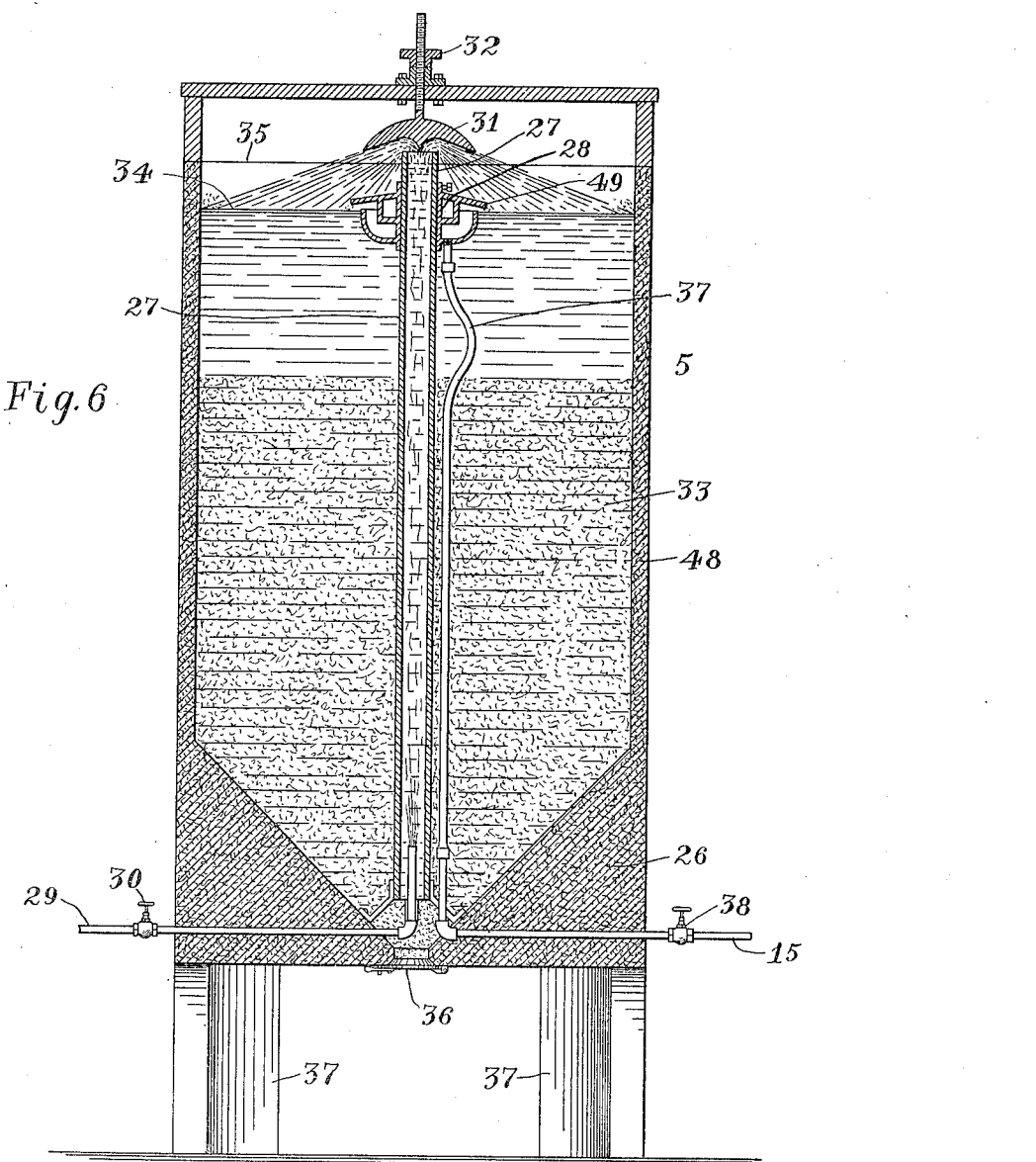

H. S. MacKAY.
APPARATUS FOR EXTRACTING METALS FROM THEIR ORES.
APPLICATION FILED JAN. 20, 1910.

1,084,351.

Patented Jan. 13, 1914.

4 SHEETS—SHEET 4.

WITNESSES:
David J. Walsh
M. A. Butler

Harry S. MacKay, INVENTOR
BY
ATTORNEY

COLUMBIA PLANOGRAPH CO., WASHINGTON, D. C.

UNITED STATES PATENT OFFICE.

HENRY S. MacKAY, OF RIVERSIDE, CALIFORNIA, ASSIGNOR TO MacKAY COPPER PROCESS COMPANY, OF RIVERSIDE, CALIFORNIA, A CORPORATION OF ARIZONA.

APPARATUS FOR EXTRACTING METALS FROM THEIR ORES.

1,084,351. Specification of Letters Patent. Patented Jan. 13, 1914.

Application filed January 20, 1910. Serial No. 538,959.

*To all whom it may concern:*

Be it known that I, HENRY S. MACKAY, a citizen of the United States, and a resident of Riverside, California, have invented certain new and useful Improvements in Apparatus for Extracting Metals from Their Ores, of which the following is a specification.

My invention relates to processes for extracting metals from their ores.

More particularly, it relates to the conversion of copper as it occurs in rock or ore in the various forms of copper sulfids, carbonates, and oxids, etc. into metallic copper.

The object of the invention is primarily to produce a means for economically extracting metals from their ores.

It also has for its object the production of a process in which the agents or elements or compounds, that combine with and are used for the extraction of the metal from the ore, may be liberated and used again for the same purpose and with substantially its original chemical strength.

The invention also has for its object to remove the metal from the ore by means of a solution containing an active agent or agents and then to remove the agent or agents from the metal and at the same time liberate them in the solution in an active relationship or condition thereby reviving the solution to its former chemical potential.

It also has for its object to remove the copper from the revived solution immediately upon its separation from the active agent which attacked it while in the ore.

In the accomplishment of my invention active elements are produced in a solution which is brought in contact with the ore. The ore is thoroughly treated with the solution preferably by leaching the ore, thereby freeing the metals of the ore. The desired metal, that is, the valuable metal which is sought to be removed from the ore and collected for commercial uses, is extracted by treatment of the solution formed after the agents have chemically united with the metals of the ore. The solution is revived by freeing the agents from the desired metal in the solution which restores the solution to its solvent power. At the same time that the solution is revived the metal is removed from the active solution and as fast as it is formed. This permits a continuous operation and prevents subsequent action of the agents on the desired metal. Successive charges of the ore are thus treated by the constantly revived solution.

For the purpose of illustrating the application of my invention and to show its operation I shall describe a method containing the invention and I shall particularly describe its use in the extraction of copper from its ore. I shall also describe a means that may be used in carrying out the process. The process and the means for carrying out the process may be greatly modified and yet such modification of the process will still contain the essence of the invention.

Figure 8:
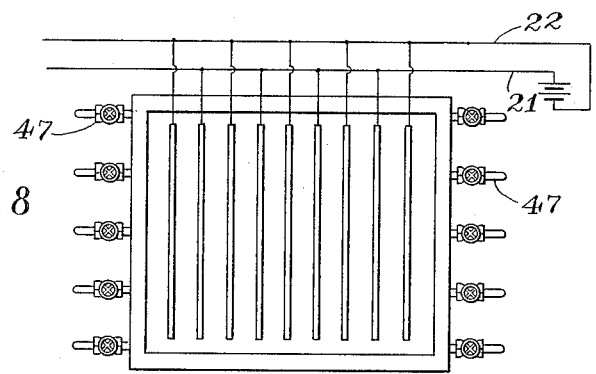

Referring to the drawings, Figure 1 illustrates a side view of one form of apparatus that may be used in carrying out a process involving the use of my invention. Fig. 2 illustrates a top view of such an apparatus. Fig. 3 illustrates a side sectional view of two of the electrolytic vats. Fig. 4 illustrates a top view of the vats illustrated in Fig. 3. Fig. 5 illustrates an end sectional view of one of the vats. Fig. 6 illustrates one form of a mixer which may be used in connection with the apparatus shown. Figs. 7 and 8 illustrate side sectional and top views of another electrolytic vat used in the apparatus shown in Fig. 1.

1 is a reservoir for containing a solution which may be used in the production of the reducing agents.

2 and 3 are electrolytic vats for treating the solution. 2 is adapted to treat the solution received from 1, and 3 likewise is adapted to operate on the solution received from 2.

4 is a tank or reservoir which receives the prepared solvent from the electrolytic vats.

5 is a tank or agitator in which charges of the ore to be leached are placed and then covered with the solvent from tank 4.

7 is an electrolytic vat used in extracting the metal from the solution which is received from the tank 5 and at the same time revives the solution so that it can be used in extracting the metal from a subsequent charge of ore that may be placed in the vat 5.

8 is a tank or reservoir adapted to receive the regenerated solution from electrolytic vat 7.

9 is a tank or reservoir which receives the metal precipitated in the electrolytic vat 7.

10 is a suitable pump which transfers the revived solution from tank 8 to tank 4. I have shown a centrifugal pump but any pump may be used which will not be materially acted upon by the regenerated solution.

11 is a pipe used to convey a solution from the reservoir 1 to the electrolytic vat 2.

12 are pipes used to convey the solution from vat 2 to vat 3.

13 are pipes used to convey the solution from the vat 3 to the tank 4.

14 is a pipe used to convey the solution from the tank 4 to tank 5 and 15 is a pipe used in conveying the solution from tank 5 to the electrolytic vat 7, and 47 is a pipe used to convey the solution from the electrolytic vat 7 to the tank 8, and 16 is a pipe or launder used to convey the copper precipitates from the electrolytic vat 7 to the tank 9, and 17 is a pipe through which the regenerated solution is discharged from the tank 8 to the tank 4.

The solution for treating the ore may be prepared by placing a solution of a salt such as common salt (sodium chlorid) in the tank 1. This solution may be prepared by either dissolving the sodium chlorid in water or by evaporating sea water in the sun or otherwise until the water carries the proper percentage of the sodium chlorid. Some natural waters, carrying salt, such as the water of Salt Lake, State of Utah, may be used without treatment.

The aqueous solution of sodium chlorid is directed into the electrolytic vat 2, shown in Figs. 4 and 5, until the compartments are filled. 18 are porous diaphragms made of any porous material that will allow a current of electricity to pass through the solution between the electrodes. The diaphragms form cells or compartments in which the electrodes are placed, the cathodes are placed in one cell and the anodes in next, a single anode or cathode being placed in the first and last of the cells.

20 are the anodes and 19 are the cathodes. The anodes may be made of any suitable soluble metal but I prefer iron. 21 and 22 are electric conductors which carry a current of electricity to and from the electrodes 19 and 20. 21 is a conductor connected with the anodes 20. 22 is a conductor which is connected with the cathodes 19. The anodes and cathodes are thus connected in parallel. The current passes into the electrolytic vats through the conductor 21 to the anodes 20 and through the solution surrounding them and the porous diaphragms 18 to the cathodes 19 and to the main conductor 22 completing the circuit back to the generator which is shown conventionally to represent any suitable generator.

Passing an electric current through an aqueous solution of sodium chlorid while using soluble metallic anodes, results in the decomposition of the sodium chlorid solution and dissolution of the metal of the anode. The current passing in through the conductor 21 to the soluble metallic anodes 20 and through the porous diaphragm liberates the sodium and hydrogen at the cathodes 19 and in the solution of the cells containing the cathodes and liberates free and nascent chlorin and oxygen at the anodes. Chlorids of the anode metal are formed and some free chlorin and oxygen and chlorin compounds remain in the solution. If iron anodes are used the result of the reaction and electrolysis will be the formation of ferrous and ferric chlorids by some of the chlorin combining with the iron. If the current is continued for a sufficient length of time all the chlorin contained in the solution will pass to that part of the solution surrounding the metallic anodes. The sodium is deposited in the compartments which contain the cathodes and it there decomposes the water of the solution and forms caustic soda. The iron dissolved in the anode solution, is partly transferred to the cathodes but as fast as it is transferred, it is precipitated in the compartments of the cathodes by the caustic soda formed in the cathode solution and falls to the bottom of the compartment. But as the iron of the anode dissolves faster than it can be deposited at the cathodes, the surplus chlorids of iron is retained in the anode compartments.

After sufficient chlorin and chlorids of iron for the required purposes are formed in the anode compartments the current is turned off and the solution is allowed to flow into another electrolytic vat 3. The vat 3 is constructed the same as vat 2 and the solution of the compartments containing the anodes of vat 2 is directed into the compartments containing the anodes of the vat 3. The same is true of the solution contained in the compartments of the vat 2 in which the cathodes are located which is directed into the corresponding compartments of vat 3. The anode compartments of vat 3 thus receive the ferrous and ferric chlorids and the other chlorin compounds in solution while the cathode compartments receive part of the original sodium chlorid solution and some caustic soda in solution.

The object in changing the solution from one vat to the other is to convert all the chlorin in the anode divisions from the lower chlorid to the higher, in this case to ferric chlorid and other active chlorin compounds but this object can be obtained by changing the anodes in the vat 2 to anodes which are insoluble instead of changing the solution as above described. Furthermore the solution may flow continuously from one vat to the other while the electrolysis is going on, the fluids being at the same time removed from the second vat.

When the electric current has been turned on, the current will pass from the insoluble anode 23 through the porous diaphragm and the solution to the cathodes 19 and back to the generator through the conductor 22. In the course of the electrolysis sodium and hydrogen are deposited at the cathodes and chlorin and oxygen at the anodes. Part of the nascent hydrogen and part of the nascent chlorin which collects at the top of the plates may, if desired, be united to form hydrochloric acid. At the same time the chlorin combines with the ferrous chlorid that passes over with the solution and converts it into ferric chlorid.

When all the ferrous chlorid in the solution is converted into ferric chlorid the preparation of the solvent is finished. The anode compartment then contains solutions of ferric chlorid, free chlorin and also if desired some hydrochloric acid. Also hypochlorous acid and other acids containing chlorin oxygen and hydrogen formed in the solutions by the operation of the chlorin on the sodium hydroxid. The cathode cells contain sodium hydroxid which is formed in the manner described above. The solution from the anode compartments is then directed into the tank 4 and the solution from the cathode compartments 24 is drawn off into a separate tank to be used as a by-product or allowed to run to waste.

When a sufficient quantity of a solvent is prepared the ore is treated with it. The ore is placed in an agitator 5. The ore is pulverized and the tank is partly filled therewith. The solution is drawn from the reservoir 4 and directed into the tank 5 until the ore is submerged. One part of the solution by weight to one part ore to two parts solution to one part ore is used as may be desired varying the proportions according to the fineness to which the ore is crushed and the texture and character of the rock.

Fig. 6 illustrates quite in detail the construction of one form of agitator. 48 is the wall of the tank which can be made of any non-metallic substance, such as reinforced concrete or wood and covered with asphaltum or other protective material. 26 is a filling which forms a conical bottom for the inside of the tank. 27 is a central tube. 28 is a movable float surrounding and adapted to move along the central tube 27. The float comprises a cup shaped part and a cover 49. The float is adapted to decant the clear solution from the ore as may be desired. The cover is adapted to protect the cup from the spray formed at the top of the tube 27. 29 is an air pipe connected with the reservoir or pump having air under pressure. The air pipe extends up a short distance into and along the axis of the central tube 27. It is provided with the valve 30. 31 is a deflector located above the tube 27. 32 is an adjusting screw to adjust the deflector 31 with respect to the central tube. The deflector causes the mechanically mixed ore and solution rising in the central tube to spread or spray over the top of the surface of the contents of the tank 5. 33 is the ore and solution in the tank. 34 is the top of the solution which covers the ore. 35 is the top of the tank. 36 is a discharge gate at the bottom of the tank. 37 are supports for the tank which hold it above the flooring so as to leave a clear space in order that the tailings may be conveyed away from underneath the gate 36.

After the ore and solution have been placed in the agitator 5, air under pressure passes in at the pipe 29 and up the tube 27 forcing with it the crushed ore and solution which enters the central tube at its lower end. The mixure comes in contact with the deflector 31 and is thrown to the outer walls of the tank. The lower end of the tube 27 is placed at the center of the conical bottom of the tank and as the mixture settles it is drawn in at the bottom of the tube 27 and carried upward to the deflector from whence it is returned down the sides of the tank making a continuous operation as long as air under pressure is passed through the pipe 29. The ore in the tank is thus thoroughly leached with the solution.

It is often necessary to agitate the ore while leaching it and it is preferable to do so to save time but the solvent under certain conditions will dissolve the copper from the ore without agitation. When the ore is leached in the solution for a sufficient time to allow the ferric chlorid and the chlorin and the chlorin acids, that is, the active elements in the solution, to form chlorids of the metals in the ore, the solution is drawn off and a new solution added until all the copper is reduced to a chlorid. The solution is drawn off by decanting the clear solution from the top of the tank, but other methods can be used to accomplish the same result.

In Fig. 6 the float 28, which is connected to the tube 27, will maintain itself on the surface of the solution. In order to decant the solution the air is stopped by the valve 30 and the ore is allowed to settle. The valve 38 is then opened and the solution flows down from the surface in the agitator through the tube 27 and through the valve 38 and pipe 15 which leads to the electrolytic vat 7.

In the leaching process, if the ore contains copper and iron, the solution carrying potentially active chlorin elements gives up a part of the chlorin; the ferric chlorid is reduced to ferrous chlorid, some of its chlorin being liberated, and the free chlorin thus liberated and the chlorin in the solution and the acids attack the copper and form cuprous and cupric chlorids. If the cupric chlorid in solution is allowed to remain in contact with the ore, it will in turn attack the copper of the ore and form cuprous chlorid thereby taking out an additional amount of the copper from the ore. When the chlorids of the metals of the ore are formed the solution is drawn off and the charge of ore may be again treated with another charge of the solution containing the elements in active relationship unless all of the copper is removed from the ore. Until this occurs the ore is leached with charges of the solution. When the copper is removed another charge of the ore is treated with the solution.

The solution drawn off from the ore is directed into the electrolytic vat 7 and the copper is removed by electrolysis. It may be separated from the solution on the cathode either in the form of electrolytic copper plate or as spongy copper in a powder condition, dependent upon the strength of the current used. At the same time that the copper is separated from the solution the chlorin with which it was combined while in solution is restored to substantially its original potential chemical relationship in the solution. The ferrous chlorid is changed to ferric chlorid, free chlorin is restored to the solution and hydrochloric and other acids are formed if desired, the same as in the original solution. The revived solution is then pumped back into the tank 4 to be used over again. Some of the chlorid of the copper may still remain in the solution but it is sooner or later removed in successive treatments in the precipitating vat.

The vat 7 has walls made of any material which will not be acted upon by the solvent or the electrolyte. 41, 41 are the anodes which are made of insoluble material. 40, 40 are the cathodes which can be made of either a soluble material or an insoluble material, but we prefer to have them made of insoluble material. 21 is the main conductor carrying the positive current of electricity to the anodes 41 which then passes through the solution to the cathodes 40 which are connected to the return 22. The electrodes in the vat are thus connected in multiple. In the arrangement shown both sides of the cathodes 40 are available as cathode surfaces. The anodes and the cathodes are located alternately in making up the cell. The current passes in through each anode and then through the solution or electrolyte to the opposing cathodes located on both sides of the anodes. The first and last anode or cathode presents but one directly opposing active surface. The vat 7 is so constructed that there is a space 42 between the bottom of the vat and the lower end of the electrodes. This space is utilized to receive the copper precipitate that is formed on the cathodes in a spongy form and falls to the bottom of the vat during the process of electrolysis.

The result of passing an electric current through the solution drawn from the ore after leaching is, that the copper in the solution, being more electro negative than iron, is deposited at the cathode first, and with the proper current density, hydrogen will also be formed at the cathode from the decomposition of the aqueous solution and oxygen and chlorin will be collected at and in the vicinity of the anodes with the result that the copper is deposited in the form of powder and precipitates to the bottom of the vat. At the same time part of the nascent hydrogen and chlorin may be combined to form hydrochloric and other acids while some of the free chlorin remains in the solution. The solution below the electrodes remains unchanged. In this condition it is non-active and it will not dissolve the copper precipitate that falls from the plates into it.

When the ferrous chlorid is converted to ferric chlorid the current is turned off. It is found by practical working of the process that to continue the current on the solution for a longer period, its power to dissolve copper is gradually destroyed for the following reasons: When a current is passed through an electrolyte carrying cupric chlorid, or cuprous chlorid and ferrous chlorid the result will be that all the copper is deposited at the cathode as metallic copper, and some hydrochloric and other acids and chlorin may be formed; then all the iron is deposited as metallic iron; the hydrogen as a gas is freed at the cathode and the chlorin as a gas is liberated at the anode.

By practical working of the process I have found that when the ferrous chlorid is converted to the ferric as above described, it then contains free chlorin and if desired hydrochloric and other acids, and is in the best condition to be used over again as a solvent. The converted solution is then drawn off through the pipes 47, 47, and returned to the tank 4 to be used over again, leaving a part of the solution in the bottom of the vat 7 which is not revived by the electrolysis and which contains the precipitated metallic copper. When sufficient copper has accumulated in the vat 7 the solution below the anodes, including the copper precipitates, is drawn off through the pipe connection 16 and directed to a storage tank or reservoir where the copper settles to the bottom. The solution is drawn off and returned to the vat 4 and the copper is placed in a suitable furnace and melted into the refined copper bars of commerce.

In the many experiments and practical tests that I have made with this process it appears that the solvent produced as above is exceedingly efficient. However, it is to be understood that I do not confine myself to the exact process or means specified herein for the production of the solution containing the active elements. A solvent prepared chemically by addition of the compounds and elements in the proper proportions has practically the same chemical activity when applied to copper carrying iron or other similar metals. The active chlorin attacks the copper and the iron of the ore and the solution may be revived upon the extraction of the copper contained in it as above described.

It is found after a long series of practical tests that the reactions that take place under the above conditions are substantially as specified, but whatever may be the reactions or whatever the active agents may be produced in carrying out the process the electrolytic reduction of copper from its ore, which has been selected for the purpose of illustration only, is accomplished by the steps described. The invention may be modified by those skilled in the art to which it pertains without departing from the spirit thereof. The invention itself may be used in many chemical or electrolytic processes to accomplish many results, what I have described above being merely an illustrative process involving and containing the essence of the invention.

What I claim as new and desire to secure by Letters Patent is as follows:—

1. In an apparatus for treating ore the combination of a leaching vat for leaching the ore, an electrolytic vat, a pipe for conducting the solution from the leaching vat to the electrolytic vat, electrodes located in the electrolytic vat and extending to a point remote from the bottom of the said electrolytic vat, a source of current to the said electrodes a pipe connected to the said electrolytic vat near the lower ends of the electrodes and adapted to convey a product of the electrolysis contained in the solution surrounding the electrodes from the vat to the said leaching vat and a pipe connected to the bottom of the said electrolytic vat and adapted to conduct away a second product of the electrolysis and the unaffected solution from the electrolytic vat located in the bottom of the said electrolytic vat.

2. In an electrolytic vat for decomposing salts of a metal of an ore, the combination of a plurality of electrodes located in the said vat and extending to a point somewhat remote from the bottom of the vat, the vat having outlets located at the lower end of the electrodes for collecting the solution charged with the acid radical released from the metal of the salt and also outlets located at the bottom of a vat adapted to collect salt forming base and the unaffected liquid contained therein.

3. In an electrolytic vat the combination of a plurality of electrodes extending to a point somewhat remote from the bottom of the vat the said vat having a plurality of outlets ranged along the sides of the vat and at the lower ends of the electrodes, the vat also having a plurality of outlets located at the bottom of the vat adapted to conduct away the metal and the unaffected solution located in the bottom of the vat.

4. In an apparatus for extracting metal from ore the combination of a leaching vat and an electrolytic vat connected with the said leaching vat and adapted to receive a solution of the salts of the metals of the ore from the said leaching vat, a source of current, electrodes connected to the source of current and extending to a point remote from the bottom of the electrolytic vat and adapted to separate a metal from one of the said salts from the acid radical combined therewith, the said vat having a plurality of outlets located at the lower ends of the said electrodes for removing the acid radical contained in the solution surrounding the electrodes, a pipe for conducting the solution located about the electrodes to the leaching means, the said electrolytic vat also having a plurality of outlets located at the bottom of the said electrolytic vat and adapted to remove the metal separated from the acid radical and the saturated solution contained in the bottom of the said electrolytic vat.

In testimony whereof, I have signed my name to this specification, in the presence of two subscribing witnesses.

HENRY S. MacKAY.

Witnesses:
F. F. CRAMPTON,
M. A. BUTLER.

---

Copies of this patent may be obtained for five cents each, by addressing the "Commissioner of Patents, Washington, D. C."